United States Patent
Halonen et al.

(10) Patent No.: US 7,336,956 B2
(45) Date of Patent: Feb. 26, 2008

(54) METHOD AND SYSTEM FOR DYNAMIC CHANNEL ASSIGNMENT

(75) Inventors: Timo Halonen, Benalmadena (ES); Juan Melero, Malaga (ES); Mark Keenan, Cambridge (GB)

(73) Assignee: Nokia Corporation, Espoo (FI)

( * ) Notice: Subject to any disclaimer, the term of this patent is extended or adjusted under 35 U.S.C. 154(b) by 630 days.

(21) Appl. No.: 10/451,890

(22) PCT Filed: Dec. 17, 2001

(86) PCT No.: PCT/FI01/01114

§ 371 (c)(1),
(2), (4) Date: Jun. 26, 2003

(87) PCT Pub. No.: WO02/054809

PCT Pub. Date: Jul. 11, 2002

(65) Prior Publication Data

US 2004/0072571 A1    Apr. 15, 2004

(30) Foreign Application Priority Data

Dec. 28, 2000  (FI) .................................. 20002877

(51) Int. Cl.
*H04Q 7/20* (2006.01)
(52) U.S. Cl. ................ 455/450; 455/452.1; 455/452.2
(58) Field of Classification Search ................ 455/62, 455/161, 166, 185, 452, 453, 519; 348/192
See application file for complete search history.

(56) References Cited

U.S. PATENT DOCUMENTS

| 5,239,682 | A | * | 8/1993 | Strawcynski et al. ....... 455/436 |
| 5,287,544 | A |   | 2/1994 | Menich et al. |
| 5,666,655 | A | * | 9/1997 | Ishikawa et al. ............ 455/512 |
| 5,732,328 | A | * | 3/1998 | Mitra et al. .................. 455/69 |
| 5,774,808 | A | * | 6/1998 | Sarkioja et al. ............. 455/436 |
| 5,862,451 | A | * | 1/1999 | Grau et al. .................. 725/116 |
| 5,903,558 | A | * | 5/1999 | Jones et al. ................. 370/351 |

(Continued)

FOREIGN PATENT DOCUMENTS

DE    199 41 846 C1    11/2000

(Continued)

OTHER PUBLICATIONS

Ikeda et al, "TDMA-Based Adaptive Modulation with Dynamic Channel Assignment for High-Capacity Communication Systems", IEEE Transactions on Vehicular Technology, vol. 49, No. 2, Mar. 2000.

*Primary Examiner*—Rafael Perez Gutierrez
*Assistant Examiner*—My X Nguyen
(74) *Attorney, Agent, or Firm*—Squire Sanders & Dempsey L.L.P.

(57) ABSTRACT

A method and system for mobile communication, in which method a channel is allocated for a connection having a certain quality of service between a mobile station and a base station in a network whose time-slots are synchronized with each other. The system collects interference information (202 to 204) from connections already in use, information on the traffic load of the network (205), defines a level value (206) for information to be communicated, forms a parameter value (201) for the channel of the cell and allocates the channel (200, 201).

15 Claims, 16 Drawing Sheets

Figure 1A:
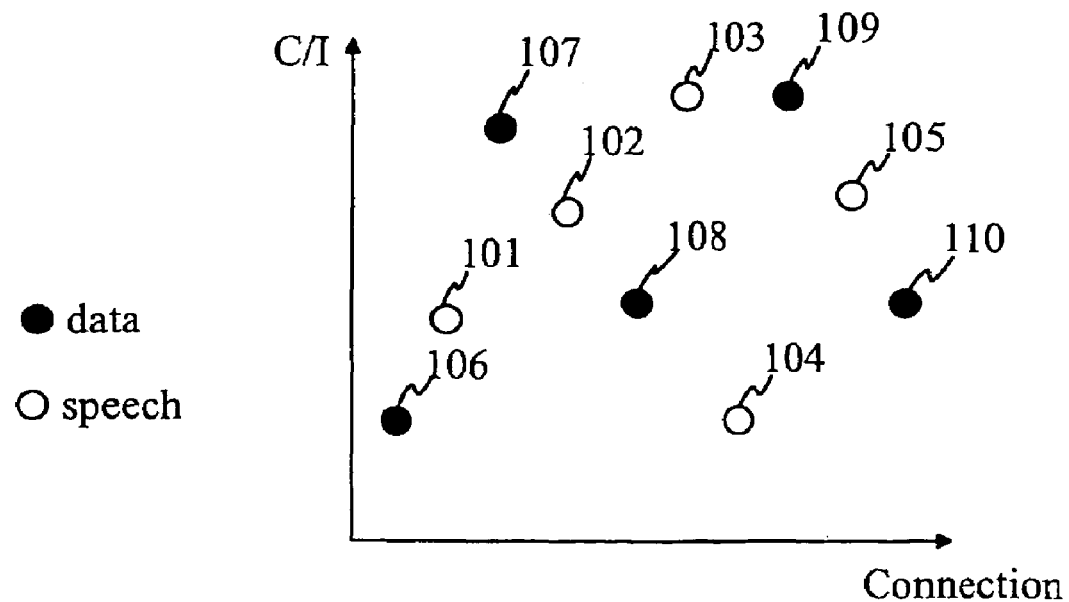

U.S. PATENT DOCUMENTS 6,219,840 B1 * 4/2001 Corrigan et al. ............ 725/117
6,473,419 B1 * 10/2002 Gray et al. ................. 370/349

FOREIGN PATENT DOCUMENTS

| | | |
|---|---|---|
| GB | 2 357 669 A | 6/2001 |
| JP | 08051662 | 2/1996 |
| JP | 09037339 | 2/1997 |
| JP | 10079976 | 3/1998 |
| JP | 10-341474 | 12/1998 |
| WO | WO 00/18153 | 3/2000 |
| WO | WO 00/24206 | 4/2000 |

* cited by examiner

|       | f1 | f2 | f3 | f4 | fn |
|-------|----|----|----|----|----|
| Cell 1 | 9  | 17 | 10 | 12 | 15 |
| Cell 2 | 10 | 25 | 20 | 17 | 13 |
| Cell 3 | 15 | 5  | 13 | 40 | 13 |
| Cell n | 12 | 13 | 15 | 12 | 15 |

Fig. 3a

|      | f1 | f2 | f3 | f4 | fn |
|------|----|----|----|----|----|
| TS 0 | 9  | 5  | 10 | 12 | 13 |
|      |    |    |    |    |    |
| TS 7 |    |    |    |    |    |

Fig. 3b

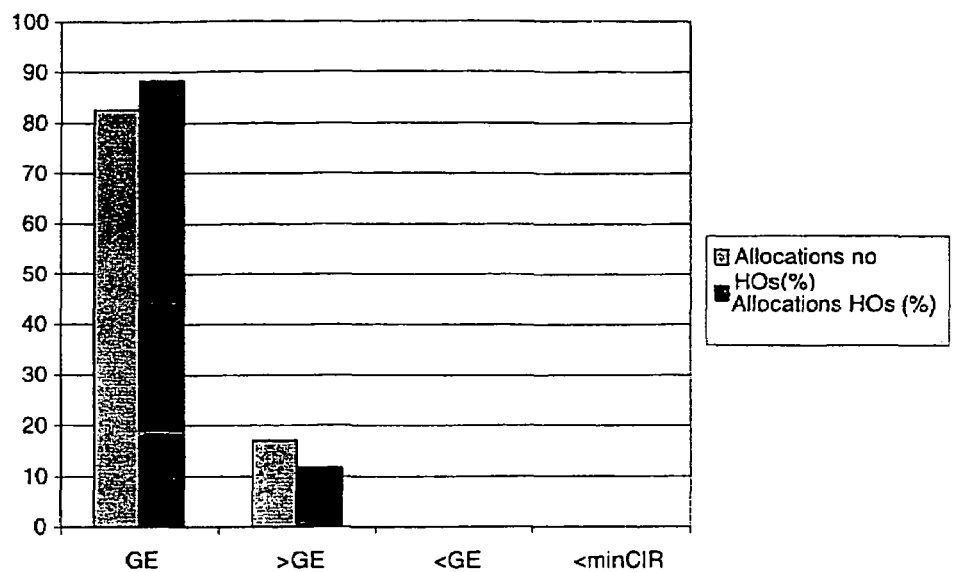
Fig 8a
Fig 8b
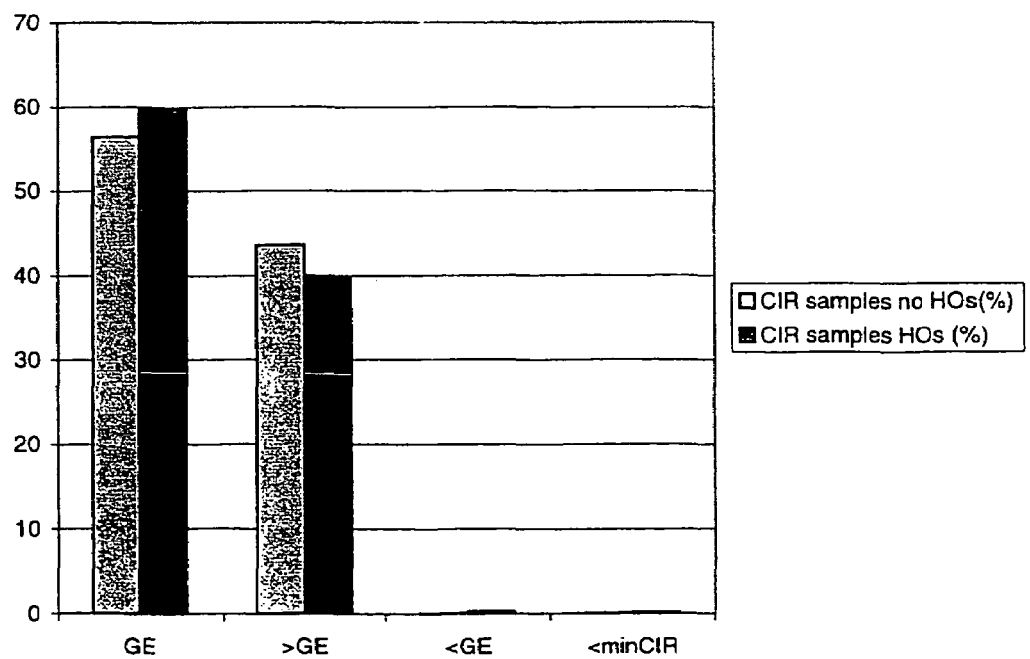

METHOD AND SYSTEM FOR DYNAMIC CHANNEL ASSIGNMENT

The present invention relates to a method and system for mobile communication and especially, but not necessarily, for dynamic frequency and channel allocation in a mobile network.

BACKGROUND OF THE INVENTION

The most problematic part of mobile networks for data transmission is the radio interface. If better-quality speech is to be transmitted or a higher data transmission rate achieved over the radio path, it requires a wider channel-specific bandwidth of the total frequency band which is limitedly available. A compromise has been made in the GSM system between the transmission rate of information and an efficient use of the frequency range. The quality of speech transmission has been improved by advanced speech-coding methods and data transmission sped up by efficient compression methods.

In a digital mobile network, the ability to receive and decode a radio signal is dependent on the carrier-to-interference ratio (C/I) in the location of the receiver. Clearly, too low C/I leads to poor quality or to the loss of the radio link altogether. On the other hand, the quality of radio communication does not become significantly higher with a very high C/I ratio, because the transmission method is designed to adapt to a certain amount of noise so that a signal received above a certain C/I level can be optimally demodulated and decoded. However, too high C/I does not maximize the network capacity especially in normal speech connections. Either the strength C of the carrier should be lowered to reduce the interference caused to other receivers or more interference caused by other receivers should be allowed. This provides means for obtaining a higher capacity from the available radio spectrum. Correspondingly, too high C/I leads to losing capacity. This leads to the known extreme objective that C/I should at each moment be evenly distributed to all receivers of the network.

However, this objective is far from being achieved in the present GSM networks. The following observations are a summary of the current status quo:

The utilisation plan of frequencies is fixed, i.e. one frequency or one frequency hopping diagram is allotted for each transceiver, such as a base station (BTS) or mobile station (MS). This prevents the allocation of a channel, i.e. frequency and time division multiple access (TDMA) time-slot (TS), to a mobile station (MS) so as to achieve an even C/I distribution in the area of the network. Generally speaking, handover (HO) and power control (PC) decisions are not based on C/I, but on other less effective variables, such as field strength (FS) and quality, such as bit error rate (BER). The base station (BTS) can perform some C/I measurements, which can also be called C/N (carrier to noise) measurements, but they are limited and done only in the uplink direction (MS to BTS). For neighbouring cells, only FS measurements are made on the broadcast control channel (BCCH) frequency. Handovers (HO) are made without direct knowledge of the radio conditions on the non-BCCH frequencies. Frequency hopping (FH) enables a statistical interference equalisation, but no active interference control exists at the moment.

A known solution to the problem is disclosed in the Nokia application (No. PCT/FI/99/00876), Dynamically Optimised Channel Allocation (DOCA), which provides an improvement to the present networks. Its most important advantages are:

C/I is determined at the location of each MS and is monitored continuously. This enables the network to detect an insufficient or excessive C/I for each MS and, further, to estimate the total C/I distribution of the downlink transmission path of the network. A local and extensive interference control is made possible.

HOs and PC of the downlink are based on C/I criteria. The network compares the impacts that possible HOs or downlink PC decisions would have on all MSs affected by such a decision. Therefore, HOs and downlink PC decisions are C/I-based. The risk of calls which are cut off due to interference becomes less.

Due to C/I-based HOs, the network can increase C/I for MSs having too low C/I and reduce C/I of MSs having too high C/I, thus distributing C/I to all MSs so as to achieve as even a C/I distribution as possible. An even C/I distribution can be implemented based on either transmission power control or C/I-based handovers HO.

With the exception of BCCH, there is no actual frequency planning in the GSM network. Frequencies are reserved as necessary to allocate channels and for HOs as defined by the C/I examination. Each TS within TRX can be allocated a different frequency, unlike when using fixed TRX-specific frequency allocations. FH is not used, i.e. the frequency used on a given channel does not usually change from one frame to another.

It is known that the quality of speech in mobile communication does not significantly improve after a certain C/I level is reached. Since traffic in the present mobile networks is not only speech but also data transmission, such as circuit-switched AMR (Adaptive Multi-Rate) speech, Internet use by browsers, VoIP (Voice over Internet Protocol) calls and multimedia applications, the quality of service (QoS) has become an important criterion when information being transmitted is to be delivered as correctly as possible. Not only in IP (Internet Protocol) networks, but also in mobile networks numerous different services will be transmitted that can comprise different requirements describing the quality of the service. A higher quality of service in a mobile network requires a correspondingly higher C/I level, in which case the optimisation of the interference level of the mobile network and an even C/I distribution are no longer expedient.

FIG. 1a shows the quality of connections when using different services in the present mobile networks. Both the connections 101 to 105 reserved for voice communication and the connections 106 to 110 reserved for data services receive an equal amount of channels whose quality of connection varies in comparison with what would be the ideal quality of each service. An air interface resource management in which the resources are used for each connection based on the quality of service required by the connection in question is at the moment not available.

SUMMARY OF THE INVENTION

A method and system for mobile communication has now been invented, in which the allocation of the channels used for connections is done based on dynamic frequency and channel allocation (DFCA). For a service, such as a call, data connection or the like, a parameter (Quality of Service, QoS) describing the quality of the service exists that can be defined or has already been defined in advance and that can be indicated as a C/I ratio or guaranteed throughput, for instance, which during a certain time moves into one direction. From the available channels, the channel is selected which as well as possible meets the requirements set for said service. For different services, parameters of different level describing the quality of the service exist, whereby channels having a lower C/I level can primarily be allocated for voice communication, for instance, and channels having a higher C/I level are correspondingly primarily allocated for data services, for instance.

The radio resource management system of the invention maintains dynamically a matrix based on the quality of the connection (C/I level) on all possible channels (for instance a combination of time-slot and frequency) which can be allocated during the establishment of each connection. This matrix provides a possibility to allocate a channel having the C/I level best suited for use on the connection in question. For instance, if a mobile user makes a VoIP call whose predefined ideal service level is C/I=12, a combination of frequency and time-slot would be selected (for instance in a base station controller) which provides a channel whose C/I level is preferably higher than or equal to the ideal level of said service.

The invention is achieved by a method in which a channel is allocated to a connection being established, in which channel frequencies of a mobile allocation list are used by indicating a mobile allocation index offset to said list. In addition, a one-way or two-way interference measurement algorithm is used or a two-way interference measurement algorithm extended by an intra-cell HO, with which the channel to be used will always be allocated from a C/I range which meets the quality requirements set for a connection of the service in question. Two-way interference measurement methods in particular are characterized in that if the channel used for the connection is located in the desired C/I range between certain limit values, other channels used later do not change the C/I level of said connection in such a manner that the connection would move outside the desired C/I range. A two-way interference measurement method extended by an intra-cell HO in particular is characterized in that if a new connection, trying to obtain a channel from within the desired C/I range on its serving channel, does not find a suitable channel from any of the free time-slots, a channel for the new connection is searched for within said C/I range among the channels already used by other connections. A C/I-based HO algorithm transfers a channel from a second connection to the new connection to be established, if a new channel meeting the quality requirements set for said second connection can be found for said second connection from said C/I range.

In the system of the invention, the time-slots of the base stations are synchronized. This means that a certain time-slot (TS) of a transceiver (TRX) is only interfered by corresponding time-slots of the transceivers (TRX) in the neighbouring cells. Periodic frequency hopping is used to achieve frequency diversity and only one frequency hopping list is needed for the entire network, but more than one list can also be used.

According to a first aspect of the invention, a method for allocating a radio channel in a communications network is implemented, the method comprising at least one base station (BTS) which defines a cell, and mobile stations in the area of said cell, which communicate with said base station on radio channels, in which method interference information is collected from channels already in use in the cell of the communications network and in at least one neighbouring cell, information is collected on the traffic load of said cell; the method being characterized by also defining a level value for the information to be communicated in the cell, forming a parameter value for the channel of the cell based on the collected interference information and traffic load, allocating for said information the channel of the cell whose parameter value best corresponds to said defined level value.

According to a second aspect of the invention, a system for allocating a radio channel in a communications network is implemented, comprising at least one base station which defines a cell, and mobile stations in the area of said cell, which communicate with said base station on radio channels, the system comprising first collection means for collecting interference information from channels already in use in the cell of the communications network and in at least one neighbouring cell, second collection means for collecting information on the traffic load of said cell; the system being characterized by also comprising definition means for defining a level value for the information to be communicated in the cell, forming means for forming a parameter value for the channel of the cell based on the collected interference information and traffic load, allocation means for allocating for said information the channel of the cell whose parameter value best corresponds to said defined level value.

According to a third aspect of the invention, an apparatus for allocating a radio channel in a communications network is implemented, comprising at least one base station which defines a cell, and mobile stations in the area of said cell, which communicate with said base station on radio channels, the apparatus comprising first collection means for collecting interference information from channels already in use in the cell of the communications network and in at least one neighbouring cell, second collection means for collecting information on the traffic load of said cell; the apparatus being characterized in that the system also comprises definition means for defining a level value for the information to be communicated in the cell, forming means for forming a parameter value for the channel of the cell based on the collected interference information and traffic load, allocation means for allocating for said information the channel of the cell whose parameter value best corresponds to said defined level value.

Figure 3C:
Figure 4:
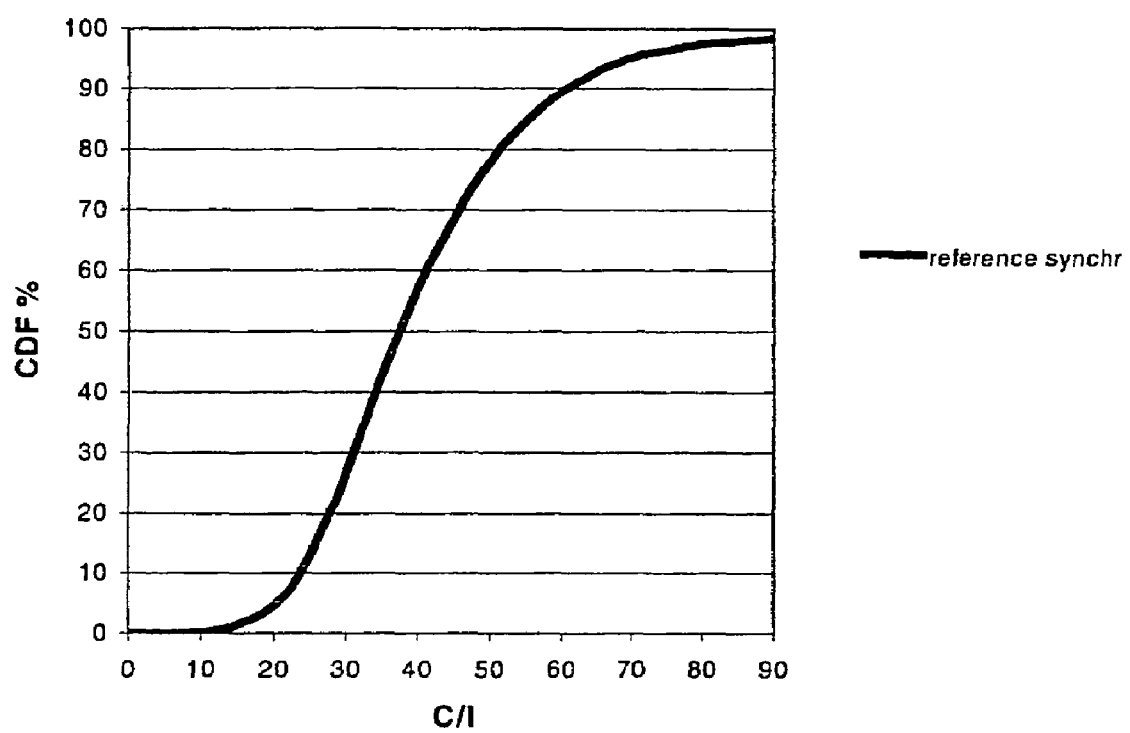
Figure 5A:
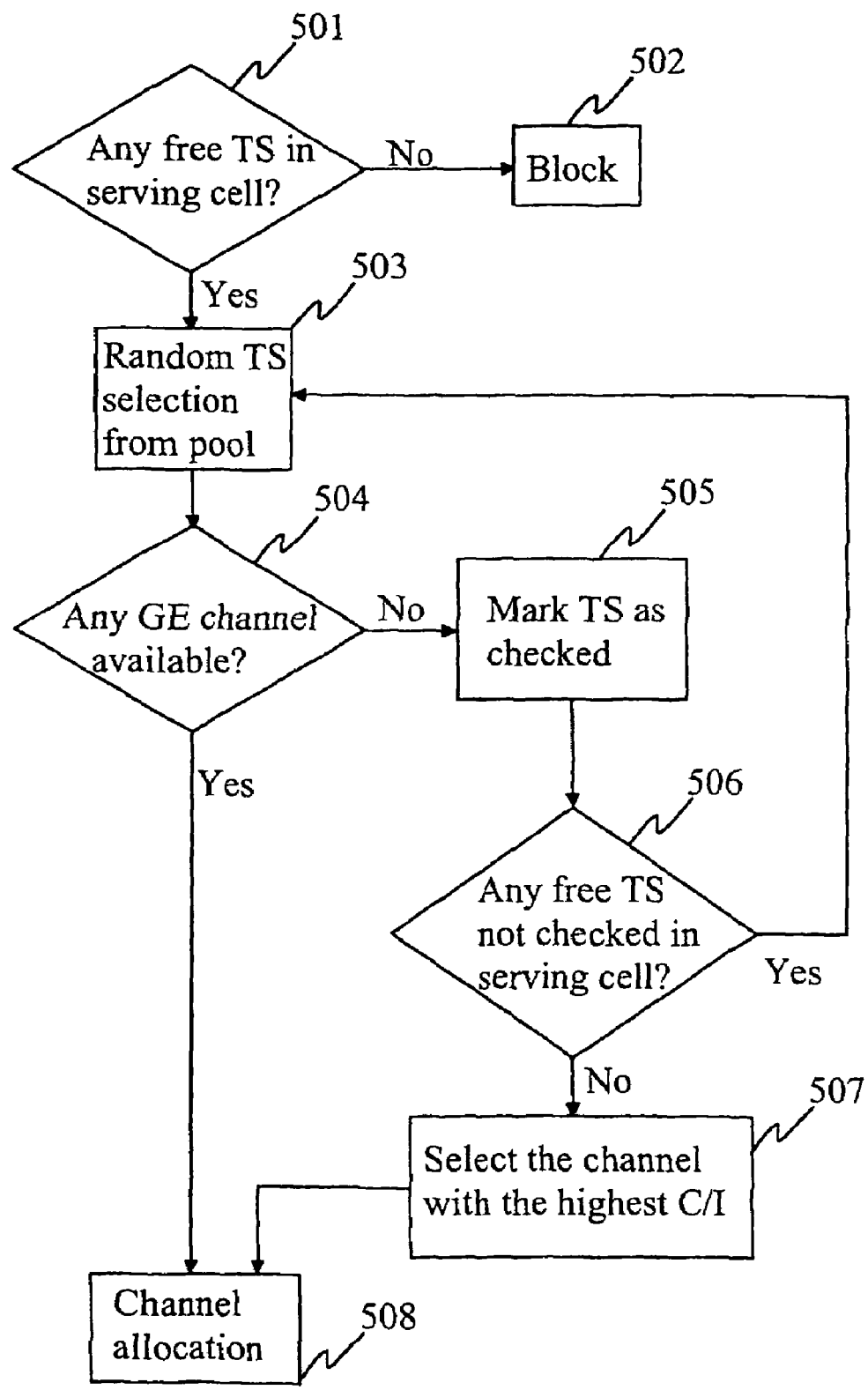
Figure 5B:
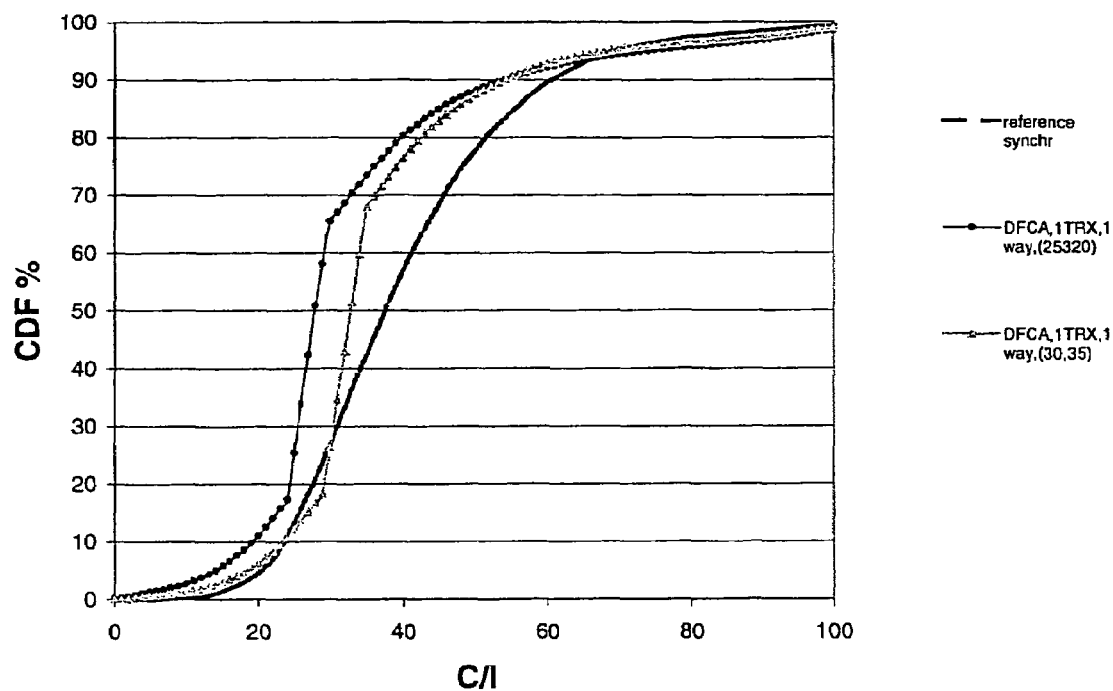
Figure 5C:
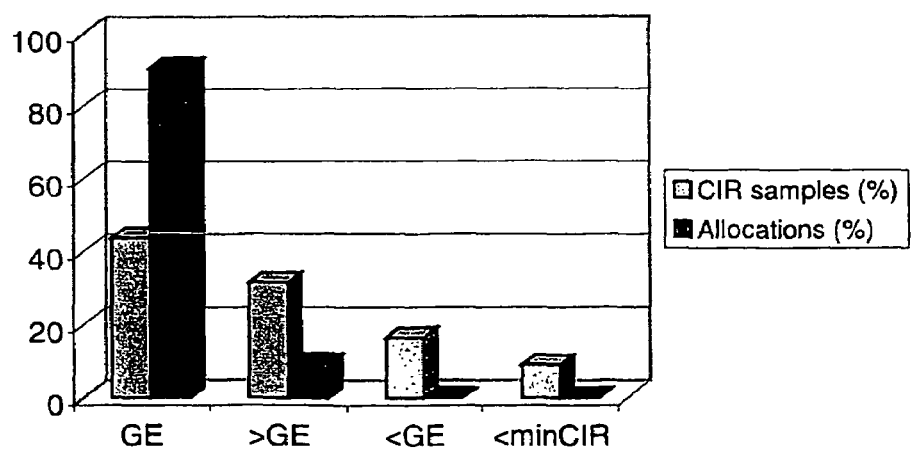
Figure 6A:
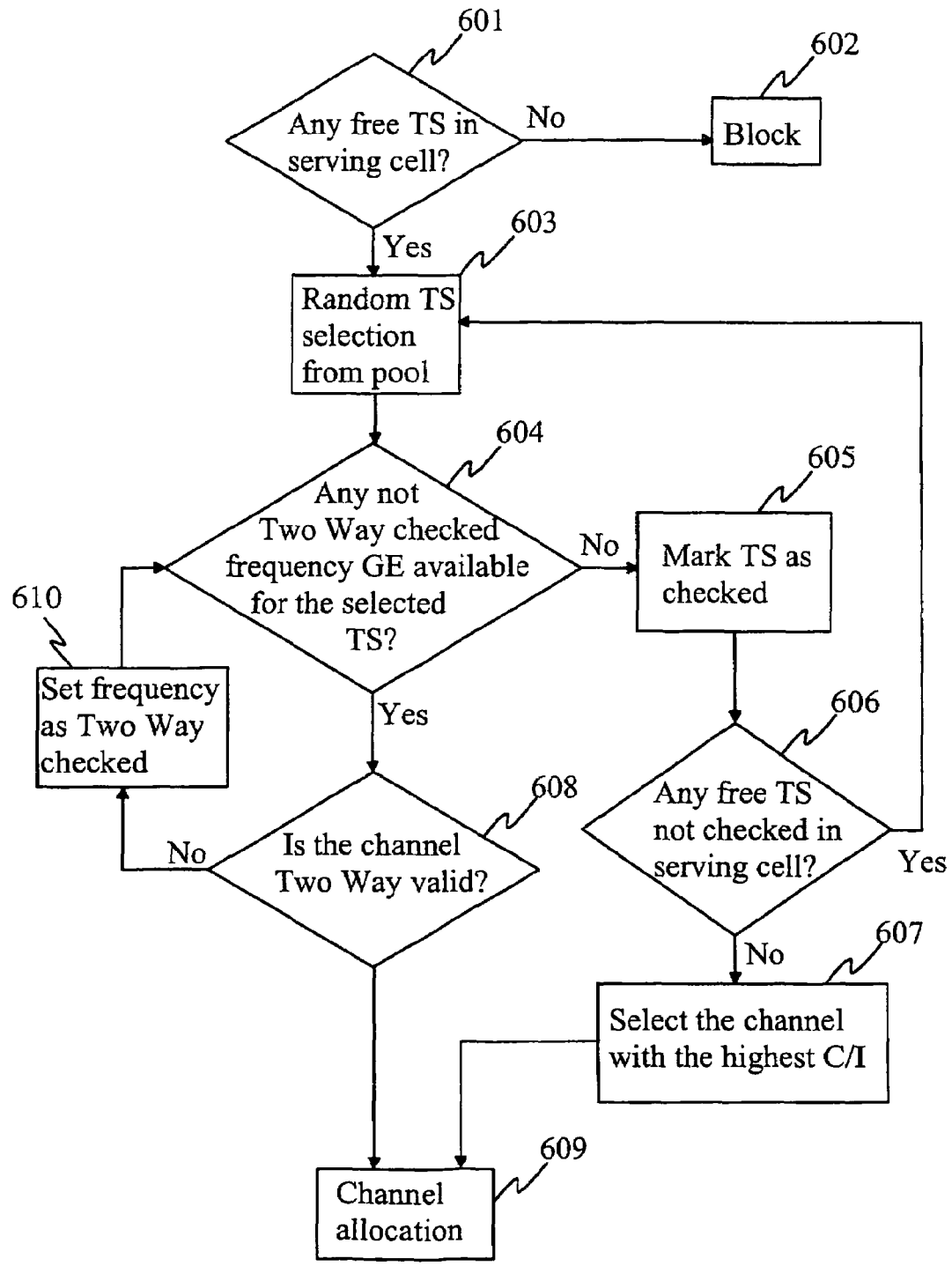
Figure 6B:
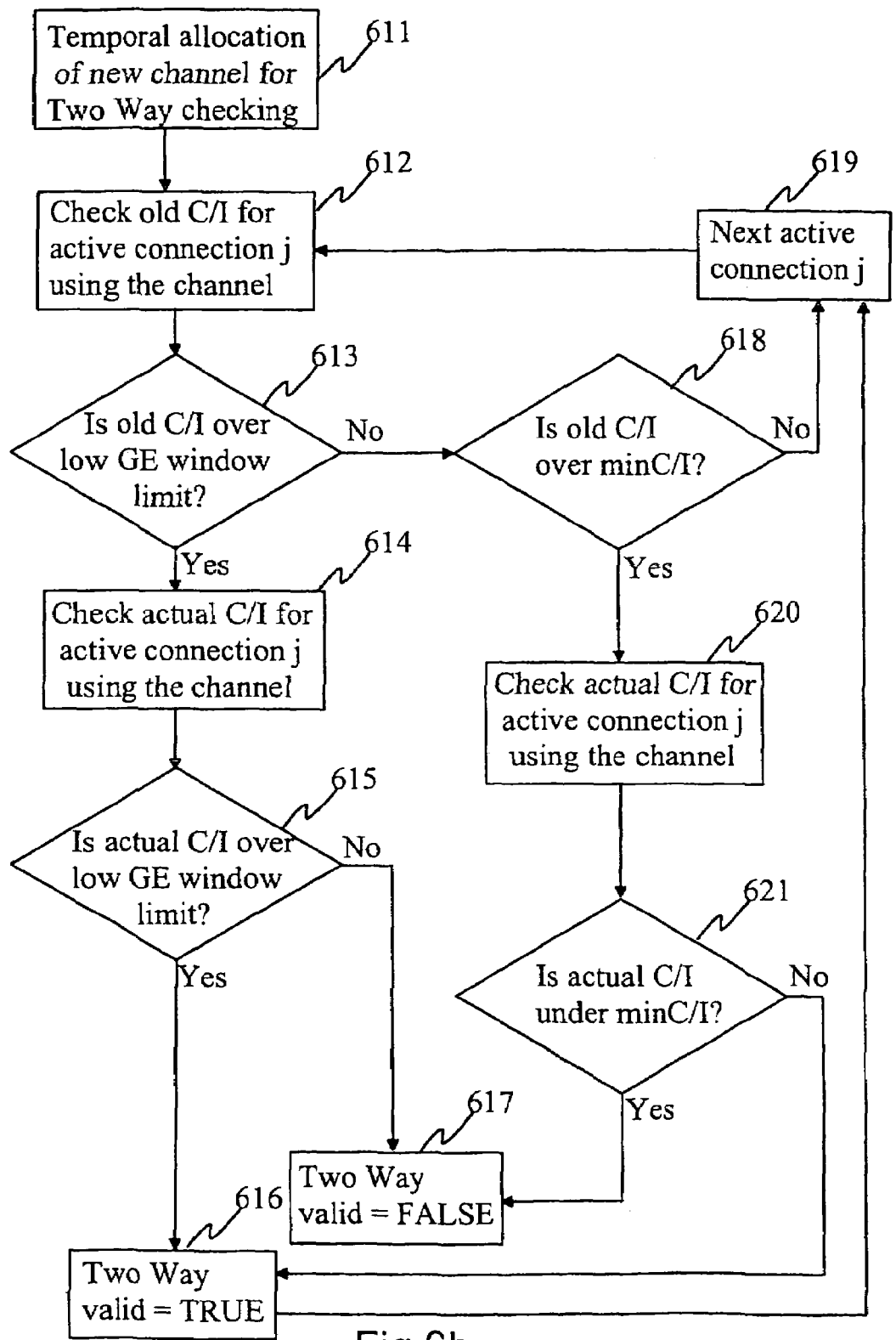
Figure 6C:
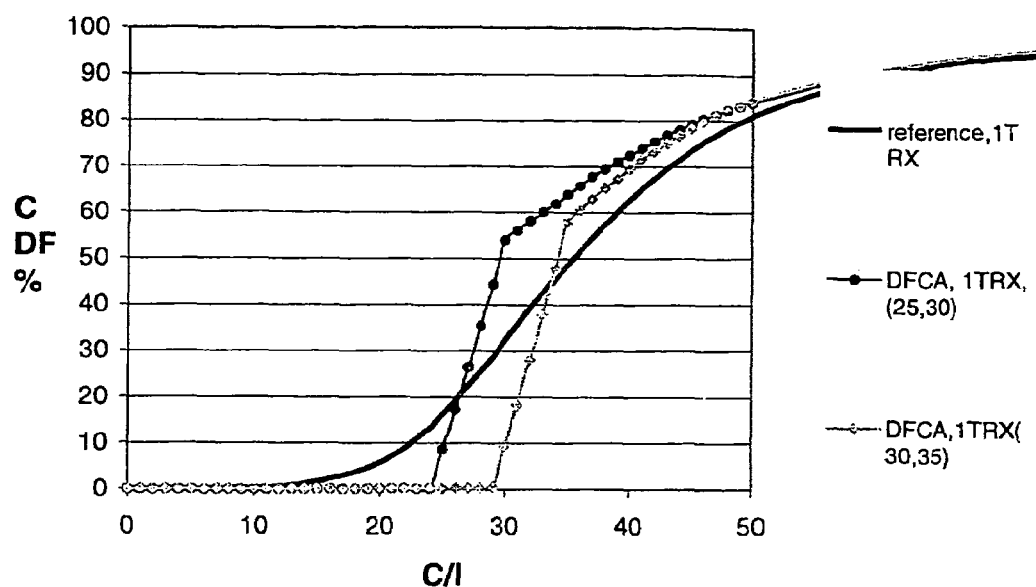
Figure 6D:
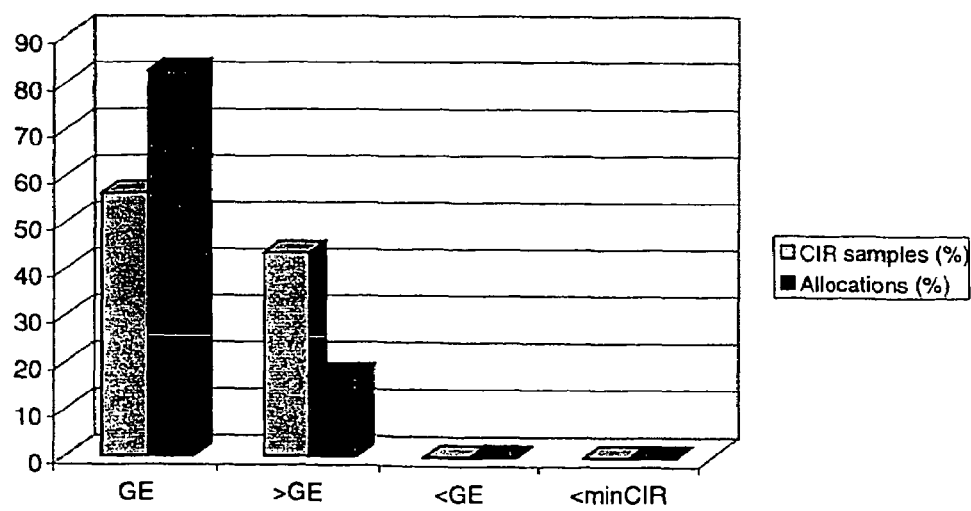
Figure 7A:
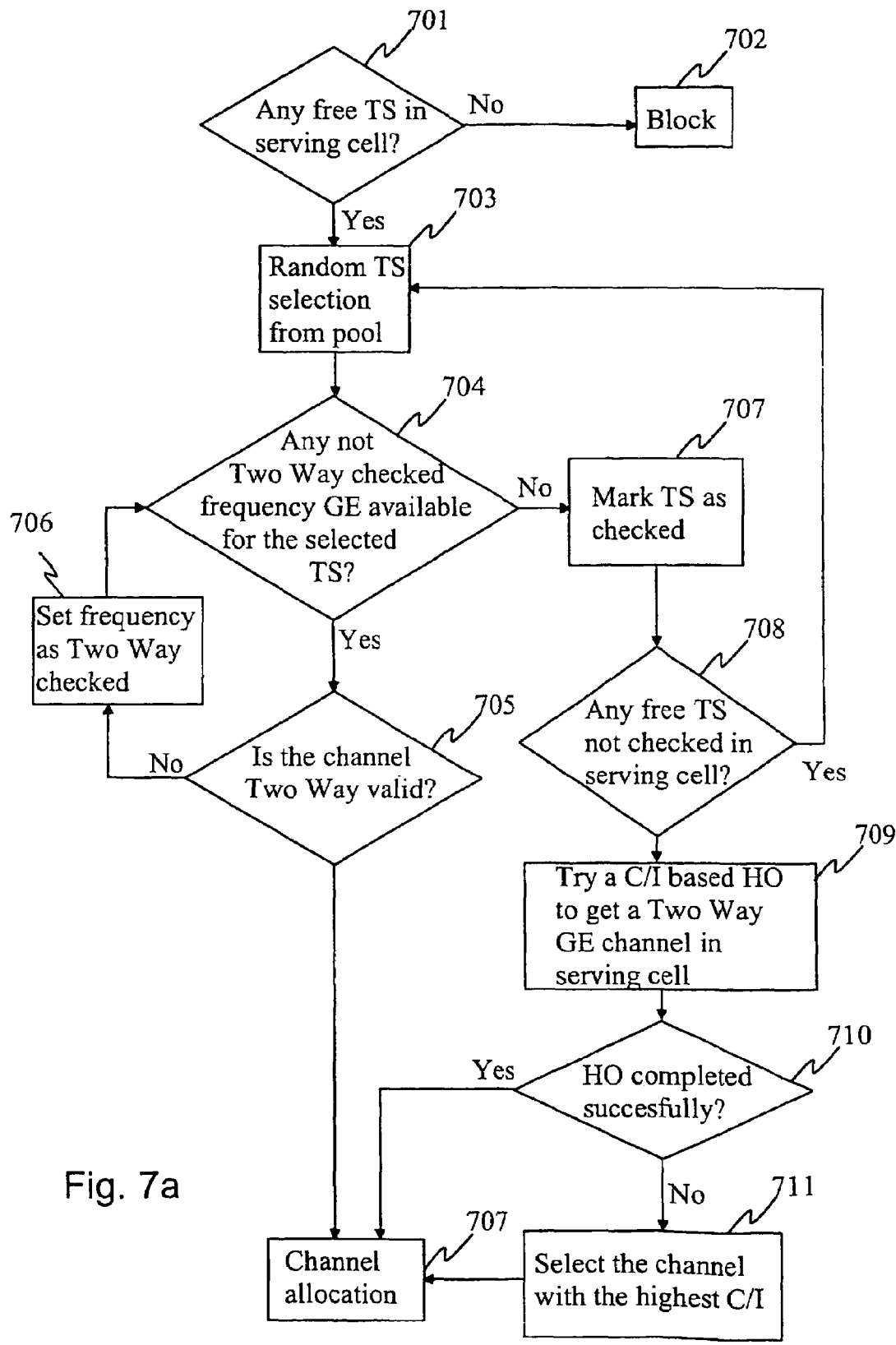
Figure 7B:
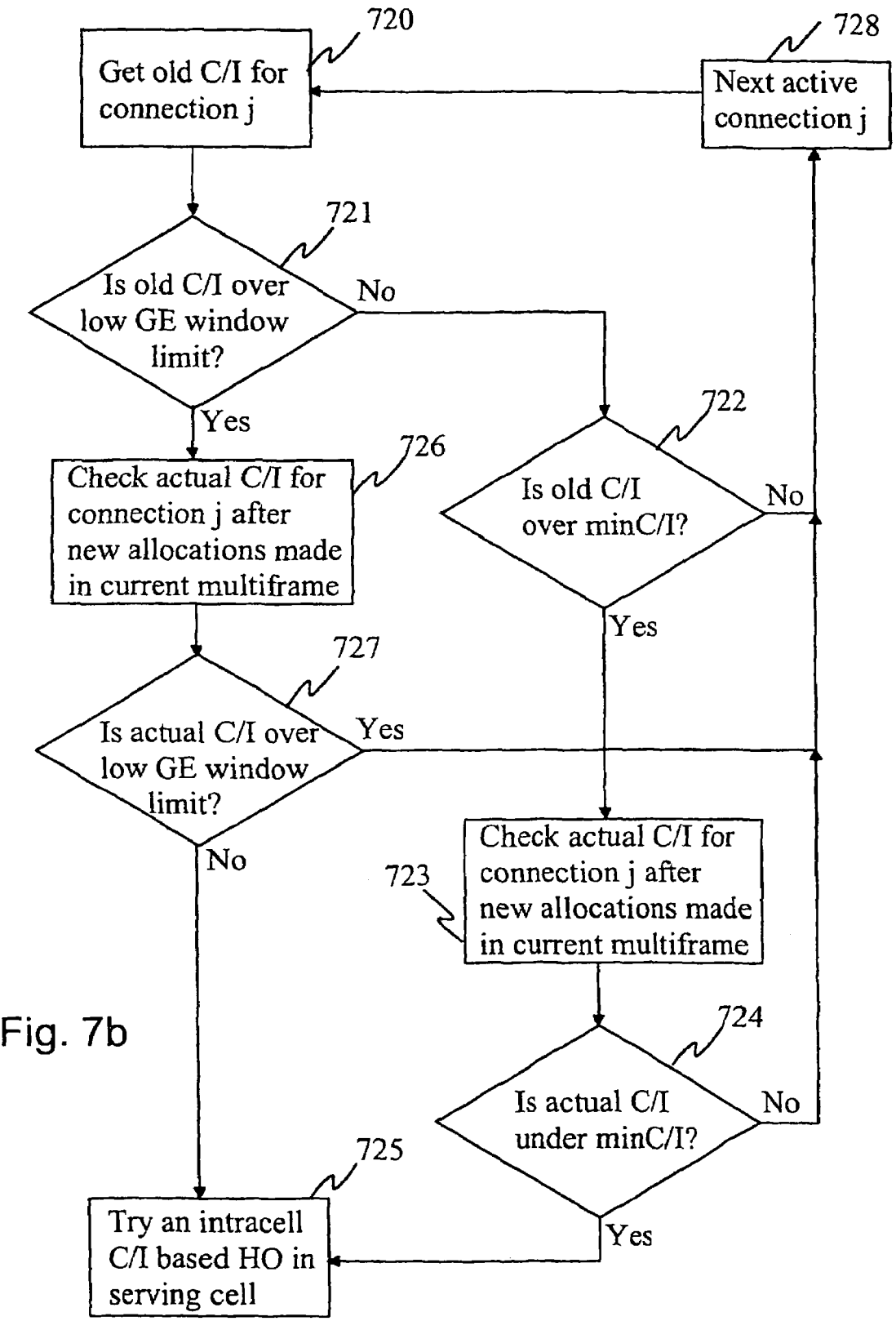
Figure 7C:
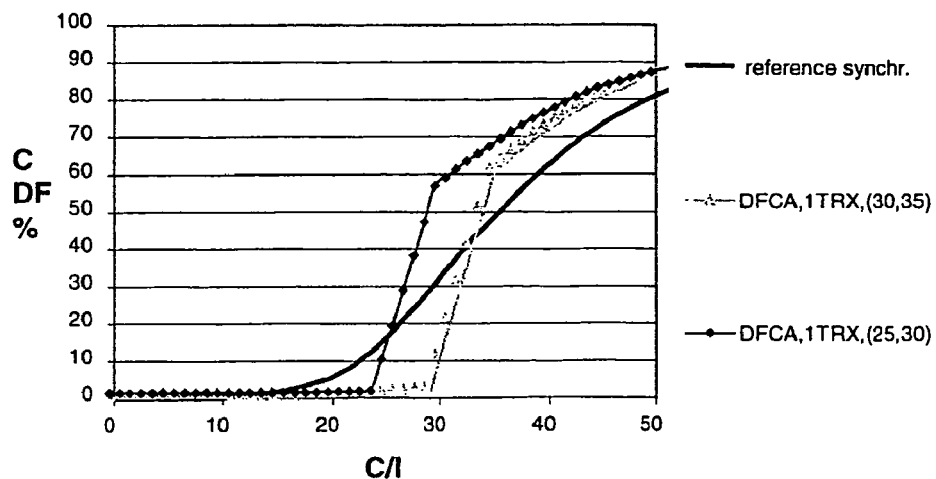
Figure 7D:
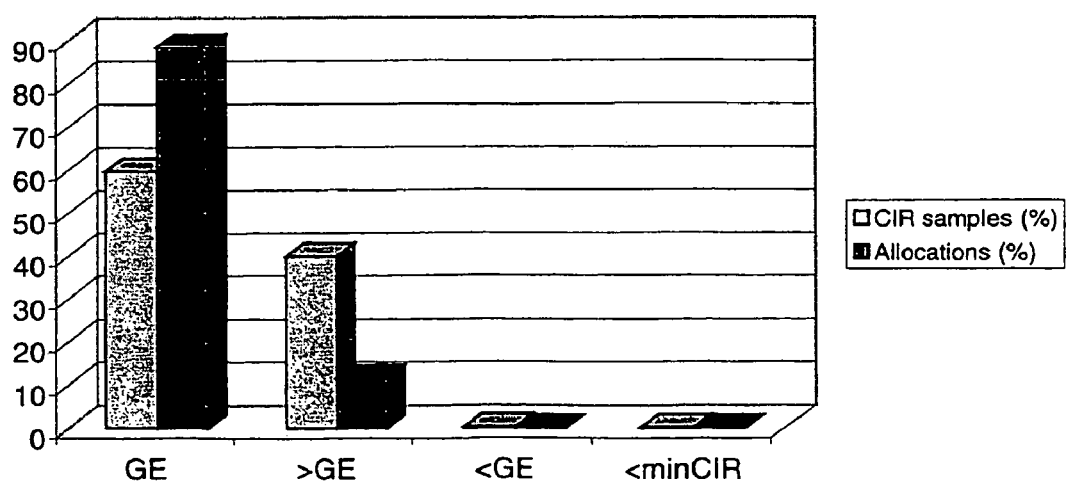
Figure 9A:
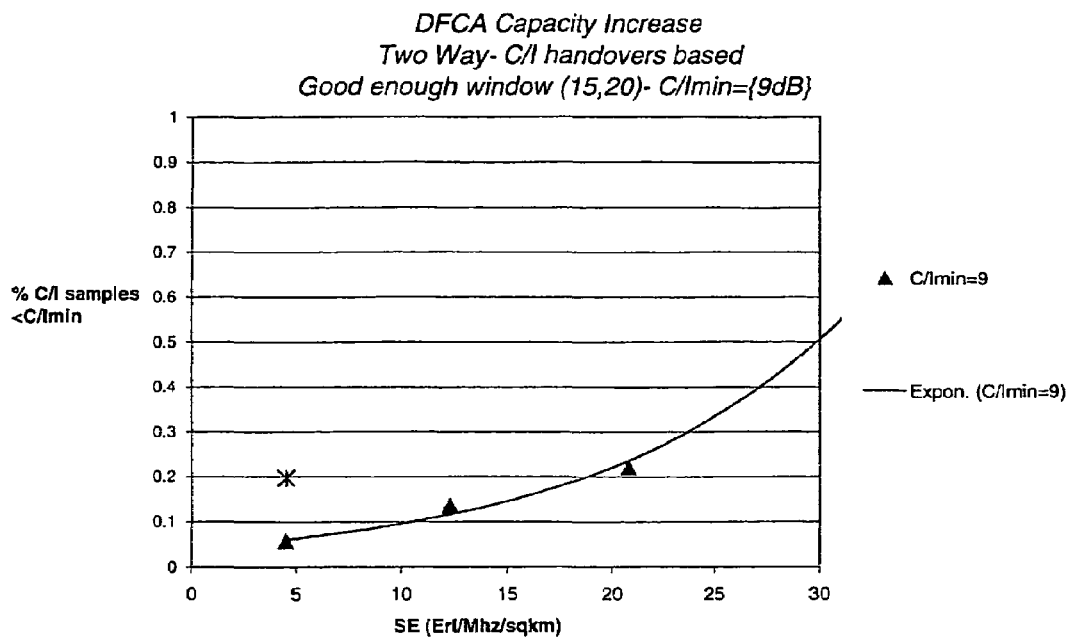
Figure 9B:
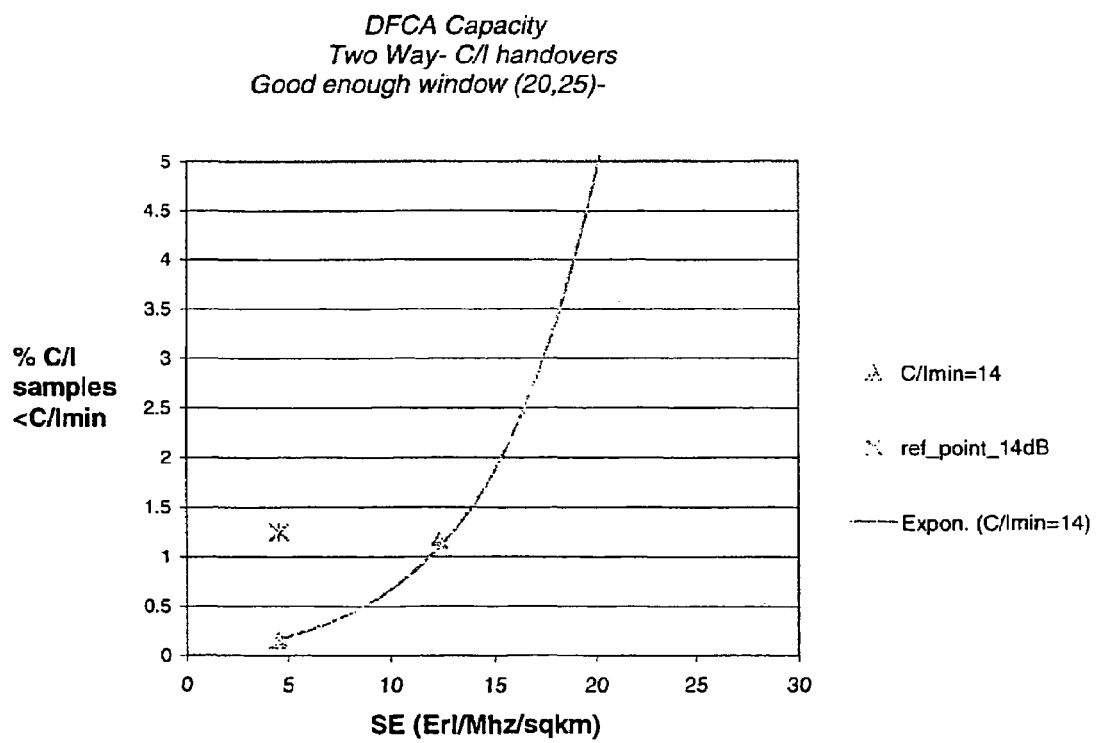
Figure 9C:
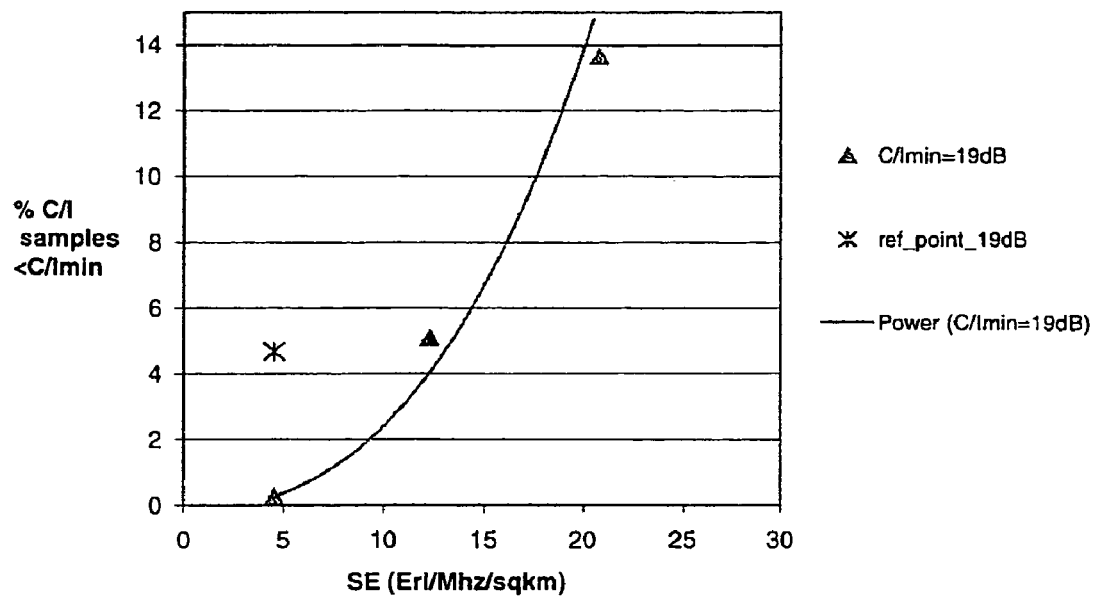
Figure 10:
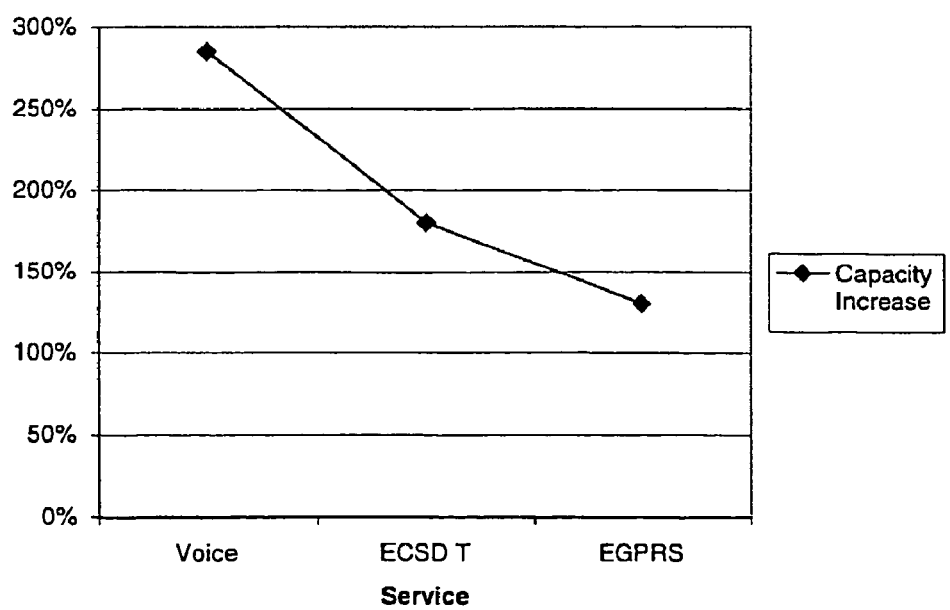

The prior art was described with reference to FIG. 1a. In the following, the invention will be described in detail with reference to FIGS. 1b to 10, in which FIG. 1a shows the connection quality (C/I level) of data and voice services when using different connections without the implementation of the invention, FIG. 1b shows the connection quality (C/I level) of data and voice services when using different connections with the implementation of the invention, FIG. 2a shows a description of the DFCA method on a general level, FIG. 2b shows a block diagram of an apparatus of the invention, FIG. 3a shows a method and C/I matrix for collecting interference information during a certain time-slot of a certain mobile station in a certain serving cell point, FIG. 3b shows the C/I matrix based on FIG. 3a for all serving cell channels, FIG. 3c shows an alternative method and C/I matrix for collecting interference information, FIG. 4 shows CDF of a reference network as a function of C/I, FIG. 5a shows a flow chart of a one-way interference measurement algorithm, FIG. 5b shows CDF based on one-way interference measurement as a function of C/I in comparison with a reference case, FIG. 5c shows in a one-way DFCA method, the percentual number of CIR samples and channel allocations in a GE window, above and it and below a minCIR level, FIG. 6a shows a flow chart of a two-way interference measurement algorithm, FIG. 6b shows a flow chart of a check algorithm of a two-way interference measurement algorithm, FIG. 6c shows CDF of two-way interference measurement as a function of C/I, FIG. 6d shows in a two-way DFCA method, the percentual number of CIR samples and channel allocations in a GE window, above and below it and below a minCIR level, FIG. 7a shows a flow chart of a two-way interference measurement algorithm extended by an intra-cell HO, FIG. 7b shows a flow chart of a C/I-based HO algorithm for ongoing calls, FIG. 7c shows CDF of two-way interference measurement as a function of C/I in C/I-based handover (HO), FIG. 7d shows in a two-way C/I-based handover DFCA method, the percentual number of CIR samples and channel allocations in a GE window, above and below it and below a minCIR level, FIGS. 8a and 8b show the improvement brought about by handover when using a two-way DFCA algorithm, FIG. 9a shows the increase in network capacity when using two-way C/I monitoring in handover, when the GE window is 15 to 20 dB and C/Imin=9 dB, FIG. 9b shows the increase in network capacity when using two-way C/I monitoring in handover, when the GE window is 20 to 25 dB and C/Imin=14 dB, FIG. 9c shows the increase in network capacity when using two-way C/I monitoring in handover, when the GE window is 25 to 30 dB and C/Imin=19 dB, FIG. 10 shows a summary of the results from FIGS. 9a to 9c.

Figure 1B:
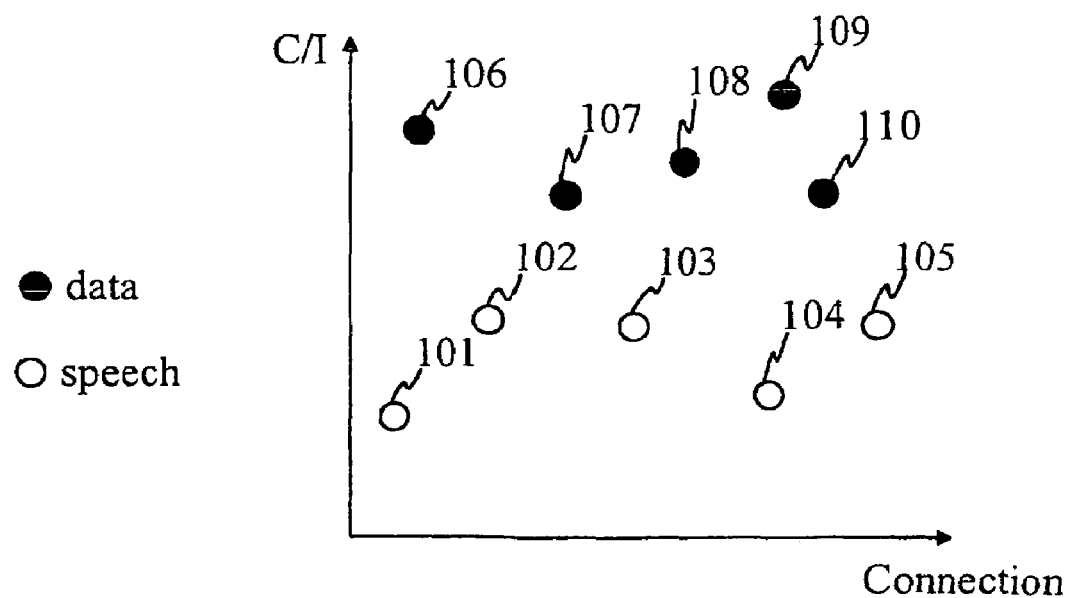

FIG. 1b shows the connection quality (C/I level) of data and voice services when using different connections. With the arrangement of the solution of the invention, different connections, such as call connections 101 to 105 or data service connections 106 to 110, are given a different-level channel for use based on the quality of service required by the connection. Due to the solution of the invention ordinary call connections presented in the figure obtain only channels whose connection quality is sufficient for the purpose of use in question. Correspondingly, data services obtain only channels which provide a sufficient connection quality for the services in question. Channels having a higher C/I level are-always allocated to connections requiring a higher quality of service, if the traffic amounts and interference factors within the area of the network allow it.

Figure 2A:
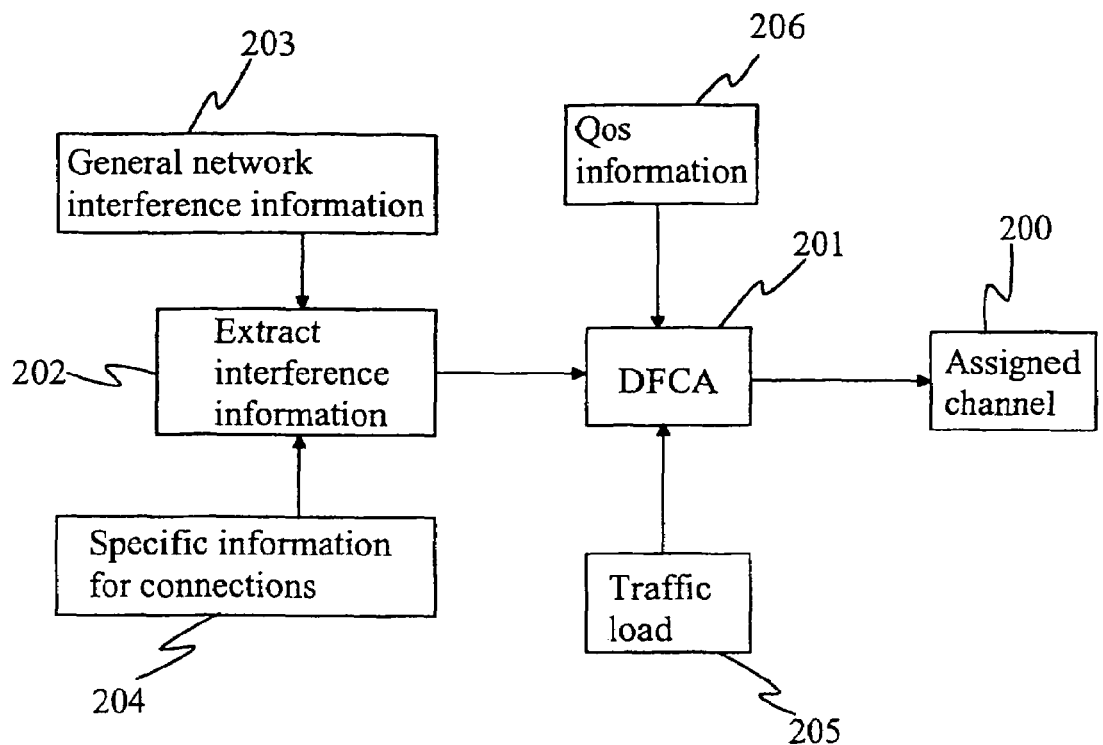

FIG. 2a shows a description of the DFCA method on a general level. Channel allocation 200 is done by a dynamic channel allocation (DCA) algorithm 201 which can comprise either a one-way or a two-way interference measurement algorithm or a two-way interference measurement algorithm extended by an intra-cell HO. The decision for channel allocation can, for instance, be based on interference information 202 received from the network, parameters 205 representing the network load and criteria 206 describing the quality of service set for the connection to be established. Interference information 202 can, for instance, comprise measured or estimated C/I levels of other connections being used (reference 203) or specific information on connections being used (reference 204). Network load can be shown as the number of connections in different cells of the network, for instance. Parameters representing the quality of service can be formed on the basis of service types, for instance, in which case a certain fixed C/I level with which the connection in question should be implemented can be predefined for a certain type of service. Alternatively, a service-specific service level can be formed dynamically for each connection to be used, for instance by proportioning the service level (C/I level, for instance) to be provided to the capacity of the network.

Figure 2B:
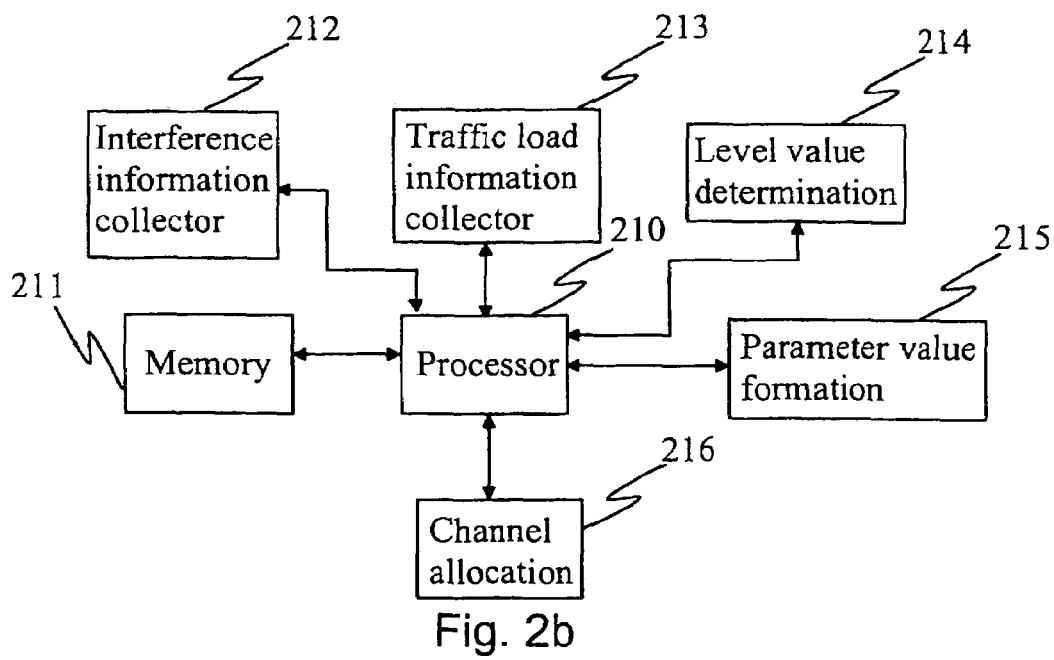

FIG. 2b shows a block diagram of an apparatus of the invention, which can reside in a base station controller BSC or base station BTS, for instance. The apparatus comprises a processor 210 and memory 211 for executing functions, means 212 for collecting interference information and means 213 for collecting traffic load information. In addition, the apparatus comprises means 214 for defining a level value, means 215 for forming a parameter value and means 216 for allocating a channel. The means 214 for defining a level value define a level value range, within which the connection quality of the channel to be allocated will be. Each service used in the communications network is predefined a level value range which corresponds to the connection quality required by each service. The level value and the level value range are preferably the signal-to-noise ratio of the radio channel, but other variables, such as the guaranteed throughput, can also be used. The level value range comprises a range between a first level value and a second level value, the second level value being higher than the first level value and the range corresponding to the connection quality required by the information to be communicated, i.e. the service for which the connection is established. The first level value and the second level value are fixed and predefined, but they can also be dynamically changed in relation to the traffic load of the communications network, for instance. The means for forming a parameter value form a parameter value for each channel of the cell based on the interference information collected in the area of the communications network and the information collected on the traffic load of the communications network. The parameter value corresponds to the current connection quality of the cell and channel allocation is done by selecting the channel of the cell whose parameter value is in the desired level value range.

The channel to be allocated by the means 216 for channel allocation is primarily allocated in such a manner that the parameter value of said channel is in the level value range required by the service. If the parameter value of none of the free channels in the cell is within the level value range required by the first service using the first connection to be allocated, a second connection being used and a second service using it are selected, the parameter value of the second connection being within the level value range of the first service using the first connection to be allocated, and said second connection used by the second service is moved from the first channel being used to a second channel whose parameter value is within the level value range required by the first service using the first connection. After this, said first connection to be allocated is established on said first channel. If the above-mentioned handover is not possible, a channel having the highest possible level value is allocated for said first connection and the first connection using it.

FIG. 3a shows a method and C/I matrix for collecting interference information during a certain time-slot of a certain mobile station in a certain serving cell point. To allocate a radio channel in a communications network, it is necessary to define in the serving cell an interference level for each combination of time-slot and frequency of the mobile station being served. A C/I matrix is calculated for each time-slot used by the mobile station in the serving cell in the current location of the mobile station, the C/I matrix comprising the interference level caused by each interfering cell (usually a neighbouring cell to the serving cell) to each frequency available to the time-slot in question in the serving cell. As an example illustrating this, FIG. 3 shows a C/I matrix for a time-slot 0 in the current location of the mobile station. Cells Cell1 to Celln cause interference, shown as the C/I levels of the matrix, to the frequencies f1 to fn of the time-slot 0. The C/I level of the most interfering cell, i.e. the cell whose C/I level for the frequency in question is the lowest, is always selected for each frequency of the time-slot 0. For instance Cell1 having a C/I level of 9 dB causes the most interference to the cell serving on frequency f1 and in time-slot 0. The least interfering cell is Cell3 having a C/I level of 15 dB. The value of Cell1 is entered on line TS 0, column f1 in the final C/I matrix according to FIG. 3b.

FIG. 3b shows a C/I matrix for all serving cell channels, based on FIG. 3a. All serving cell channels, i.e. all combinations of time-slot and frequency that can be used for channel allocation and handover of the mobile station being served, are collected to the matrix. A channel which provides the connection quality predefined for a certain service being used by the mobile station is selected from the matrix.

FIG. 3c shows an alternative method and C/I matrix for collecting interference information. The column Interferer (reference 301) of the C/I matrix is a reference to the list of interfering cells, i.e. to the cells which are defined as neighbouring cells and of which either measurements have been obtained or information exists in the background matrix. The column C/Iest (reference 302) shows the estimated C/I level of each interfering cell in decibels. The estimated C/I level is at a 90% probability with respect to the traffic of said cell better than or equal to the value of the C/I column. For instance on line 3, the C/I level of the interfering cell I3 will at a 90% probability be less than 12 dB, if the same frequency is used. The column C/Icalc (reference 303) shows the measured and reported cells. Column 304 shows the interfering cells which are neighbouring cells to the serving cell and the number of which can be 6 according to the GSM specification (GSM 05.08). If an actual measurement is obtained from a neighbouring cell N1 to N6, in which case there is no need to use the C/Iest values of the background matrix, the estimated C/I can be replaced by the actual measurement result C/Icalc. A C/I level which is equal to or better than 9 dB has at a 90% probability been estimated for the neighbouring cell N1 to the serving cell. An actual C/I level of 5 dB is obtained from measurement for the neighbouring cell in question, and the estimated value in the background matrix for said neighbouring cell N1 can be updated with the new calculated value.

All information in the background matrix is available to the base station controller so that it can calculate a C/I matrix for each time-slot of each connection. Thus, a C/I matrix comprising an exact C/I level at each time for each available frequency is generated in each cell.

Measurement results are obtained for the neighbouring cells to the serving cell and the current resources of the neighbouring cells are known. Time-slots are shown as indexes (Mobile Allocation Index Offset, MAIO) in a mobile allocation list, an index showing the point in the mobile allocation list, from which frequency hopping will be started at each time. By examining the. neighbouring cells, all MAIOs used in the interfering cells are revealed in a synchronized network. When the information on the neighbouring cells in the background matrix is added to this information, a C/I level can be estimated for each MAIO frequency, i.e. the quality of the channel with each MAIO is found out. The power used in the interfering cell is also taken into consideration in each time-slot, this being done in such a manner that a mobile, such as a mobile station, measures the neighbouring cells on the BCCH frequency and the power used in the interfering cell is scaled with the BCCH frequency. The allocation situation of the channel can also be taken into consideration, since a time-slot without an ongoing call does not cause interference.

FIG. 4 shows the cumulative distribution (Cumulative Distribution Function, CDF) of the connections in a reference network as a function of C/I. The reference network, which is later compared with other simulation results, provides a conventional network configuration comprising 36 three-sector base stations. This type of network provides an even traffic distribution and coverage for the entire area. The utilisation plan of frequencies (12) is based on 4/12 reuse, which provides good quality for the entire network area, as can be seen from FIG. 4 on the basis of the C/I cumulative distribution function obtained in simulation. Interference calculation was made assuming BSS synchronization, in which case the time-slots were assumed to be synchronized. Only the active connections which use the same channel as the connection being examined are added as interfering sources to the final calculation. The descriptor of FIG. 4 is used as a reference case to be compared with one-way or two-way interference measurement simulations described later.

FIG. 5a shows a flow chart of a one-way interference measurement algorithm. First a check is made to see if the serving cell has any free time-slots (step 501). If there are no free time-slots, the next step is step 502, in which for instance the user can be notified that the connection cannot be established. If there are free time-slots available, one of them is randomly selected for examination (step 503). Next (step 504), a check is made to see if there is a channel available for the time-slot that would meet the parameter describing the quality of service set for the connection. If a channel meeting the conditions is found, the channel in question is taken into use (step 508). If no channel meeting the conditions is found for the time-slot in question in step 504, said time-slot is marked checked (step 505) and a check is made to see if there are unchecked time-slots left (step 505). If there are unchecked time-slots left, the next step is step 503, otherwise the channel having the highest C/I level (step 507) is selected and said channel is taken into use (step 508).

FIG. 5b shows CDF based on one-way interference measurement as a function of C/I in comparison with a reference case. In the case of one-way interference measurement, the best suited channel complying to the Good Enough (GE) criterion is searched for each connection to be established from its own C/I matrix. The criterion, a GE window, is defined as an area forming two C/I levels. When using this method, the interference which the new connection to be established causes to the already active connections on the same channel at the moment in question is not taken into account due to the one-way nature of the method.

A first GE window comprises a C/I range from 25 to 30 dB and a second GE window a C/I range from 30 to 35 dB. The DFCA algorithm tries to reserve as many connections within these GE windows as possible. Regardless of the fact that most of the channel allocations are made within the GE window, the allocations of new channels lower the connection quality of the active connections.

As shown in FIG. 5b, the percentual share of connections having a lower C/I level than the minimum level of the GE window increases considerably in comparison with a corresponding reference case. Approximately 25% of all connections ended below the GE window 25 to 30 dB in the DFCA algorithm simulation, whereas in the reference case, the corresponding result was approximately 13%. Approximately 26% of all connections ended below the GE window 30 to 35 dB in the DFCA algorithm simulation, which equals the result of the reference case. The advantages of an allocation plan are achieved at the cost of lower quality in some connections.

FIG. 5c shows the percentual number of CIR samples and channel allocations within the GE window, above and it, and below the minCIR level in a one-way DFCA method. Even though a preliminary allocation of channels was done in favourable C/I conditions, i.e. 90.7% of the allocations is within the GE window and 9.3% above it, the CIR samples collected during simulation result in 43.8% of the samples being within the GE window and 31.5% above it. A part of the samples (16.4%) is below the GE window and some samples (9.0%) are even below the minCIR level. The parameter minCIR is a quality measuring point related to each GE window and used later in estimating the capacity increase achieved by the DFCA method. It refers to the lowest acceptable C/I value (quality/service requirements) given to a selected GE window. It is calculated according to the following formula in such a manner that a fading margin of 6 dB is subtracted from the lower value of the GE window.

$$\text{MinCIR} = \text{LowestGEwindowCIR} - \text{FadingMargin (6 dB)}$$

FIG. 6a shows a flow chart of a two-way interference measurement algorithm. First a check is made to see if the serving cell has any free time-slots (step 601). If there are no free time-slots, the next step is step 602, in which for instance the user can be notified that the connection cannot be established. If there are free time-slots available, one of them is randomly selected for examination (step 603). Next (step 604), a check is made to see if there is a channel available for the time-slot that would meet the parameter describing the quality of service set for the connection. If a channel meeting the conditions is found, the next step is step 609 in which the channel is examined to see whether it is two-way valid. If the condition is met, the channel in question is taken into use (step 608). If the condition in step 609 is not met, said frequency is marked checked (step 610) and the routine moves to step 604. If a frequency meeting the conditions is not found for the time-slot in question in step 604, said time-slot is marked checked (step 605) and the next step (step 606) is to see whether there are unchecked time-slots left. If there are unchecked time-slots left, the routine moves to step 603, otherwise the channel having the highest C/I level is selected (step 607) and said channel is taken into use (step 609).

FIG. 6b shows a two-way check algorithm of the algorithm shown in FIG. 6a in step 608. In step 611, the channel is subjected to a two-way checking and the old C/I value of the connection j using the same channel is checked (step 612). If the old C/I value is not higher than the lower limit value of the GE window (step 613), the routine checks if the old C/I value is higher than the minC/I value (step 618). If the old C/I value is lower than the minC/I value, the routine moves to step 619 and the next connection j is selected, after which the routine moves to step 612. If the old C/I value is higher than the minC/I value in step 618, the routine checks if the actual C/I value of the channel used by the connection j is lower than the minC/I value (step 620, 621). If the condition is met, the routine moves to step 617, in which it is noted that the channel in question does not meet the criteria of the two-way checking. If the condition of step 621 is not met, i.e. the actual C/I value is higher than minC/I, the routine moves to step 616, in which it is noted that the channel in question meets the criteria of the two-way checking. If in step 613 the old C/I value is higher than the lower limit value of the GE window, the routine checks if the actual C/I value of the channel used by the connection j is lower than the minC/I value (step 614, 615). If the condition is not met, the next step is step 617, in which it is noted that the channel in question does not meet the criteria of the two-way checking. If the condition in step 615 is met, i.e. the actual C/I value is higher than minC/I, the next step is step 616, in which it is noted that the channel in question meets the criteria of the two-way checking.

FIG. 6c shows CDF based on two-way interference measurement as a function of C/I in comparison with a reference case. In the case of two-way measurement, an incoming call is not allocated a new channel, if the interference it causes to the existing connections reduces the quality of service of said connections within a certain margin. A first used GE window size is set at 25 to 30 dB and a second at 30 to 35 dB, as in one-way measurement.

Using two-way interference monitoring improves the quality of the network, because the quality of service is controlled better. If a user obtains a channel within the GE window, other later allocated channels will not change the C/I conditions of said connection to the extent that they move outside the desired GE window.

FIG. 6d shows the percentual number of CIR samples and channel allocations within the GE window, above and below it, and below the minCIR level in a two-way DFCA method. Approximately 83% of the allocations are within the GE window and approximately 17% above it. Approximately 56% of the CIR samples are within the GE window and approximately 44% above it. The figure shows a significant improvement in comparison with one-way measurement. All CIR samples collected during simulation are now located inside or above the GE window.

FIG. 7a shows a flow chart of a two-way interference measurement algorithm extended by an intra-cell HO. First a check is made to see if the serving cell has any free time-slots (step 701). If there are no free time-slots, the next step is step 702, in which the user can be notified that the connection cannot be established. Otherwise, one of the free time-slots is randomly selected (step 703) and a check is made to see if a frequency that has not been two-way-checked can be used in the time-slot in question (step 704). If a frequency is found for the time-slot, a check is made to see if the channel formed by said time-slot and said frequency meets the two-way condition (step 705). If the condition is not met, said frequency is marked checked (step 706) and the routine moves to step 704. If the conditions are met, the channel is reserved for use (step 707). If no frequency is found, the time-slot is marked checked (step 707) and the routine checks whether there are unchecked time-slots left in the serving cell (step 708). If there are more time-slots, the routine returns to step 703, otherwise a C/I-based HO is attempted to obtain a two-way GE window for the serving cell (step 709), after which the routine checks whether the HO succeeded (step 710). If the HO succeeded, channel allocation is performed (step 707), otherwise the channel having the highest C/I level is selected (step 7011) and channel allocation performed (step 707).

FIG. 7b shows a flow chart of a C/I-based HO algorithm for ongoing calls (step 709 in FIG. 7a). First, the old C/I value of the connection j is examined (step 720) and compared with the lower GE window limit value (step 721). If the C/I value of the connection j is lower than said limit value, the C/I value of the connection j is compared with the lowest allowed C/I value minC/I (step 722). If the C/I value of the connection j is lower than the lowest allowed value minC/I, the next active connection is selected for examination (step 728) and the routine moves to step 720. If the C/I value of the connection j is higher than the lowest allowed value minC/I (in step 722), the current C/I value of the connection j is examined after new allocations in the multiframe in question (step 723), after which the current C/I value of the connection j is compared with the lowest allowed C/I value minC/I (step 724). If the current C/I value is higher than minC/I, the next active connection is selected for examination (step 728), otherwise it is noted that that the current C/I value is lower than minC/I and an intra-cell C/I-based HO is performed on the serving cell (step 725). If the C/I value of the connection j is higher than said limit value minC/I in step 721, the current C/I value of the connection j is examined after new allocations in the multiframe in question (step 726), after which (step 727) the current C/I value of the connection j is compared with the lower GE window limit value (step 721). If the current C/I value is higher than the lower GE window limit value, a new connection is selected for examination (step 728) and the routine moves to step 720. If the current C/I value is lower than the lower GE window limit value, an intra-cell C/I-based HO is performed on the serving cell (step 725).

FIG. 7c shows CDF of two-way interference measurement as a function of C/I in C/I-based handover (HO) in comparison with a reference case. When using two-way measurement, a new call trying to obtain a channel on its serving channel from an area defined by the GE window does not find a free time-slot, but instead may obtain a channel having a quality it requires from time-slots which are already reserved for other existing connections. Before taking a poorer channel into use on the serving channel, the C/I-based handover algorithm can try to obtain a channel having an acceptable C/I level required by the connection.

A second alternative for a C/I-based handover algorithm is for instance a continuous process which examines the interference status of active calls. If allocating new channels causes a lower network quality, the process optimises the C/I level by making an intra-cell handover. The first used GE window size is set at 25 to 30 dB and the second at 30 to 35 dB, as in one-way measurement.

FIG. 7d shows the percentual number of CIR samples and channel allocations within the GE window, above and below it, and below the minCIR level in a two-way C/I-based handover DFCA method. Approximately 88.4% of the channel allocations are within the GE window and approximately 11.6% above it. Approximately 60% of the CIR samples are within the GE window and approximately 40% above it. As the figure shows, almost all channel allocations are either within the area of the GE window or above it.

FIGS. 8a and 8b show an improvement brought about by handover when using a two-way DFCA algorithm. In C/I-based HO, the GE allocations can be better controlled than in C/I-based allocation without HO.

FIG. 9a shows the increase in network capacity when using two-way C/I monitoring in handover, when the GE window is 15 to 20 dB and C/Imin=9 dB. The GE window in question represents a C/I level used in voice communication. In an ordinary network without two-way monitoring, the SE value is 4.54 Erl/MHz/sqkm when 0.2% of the C/I samples is below the C/Imin value. Two-way interference monitoring increases the figure that represents network capacity to SE=18 Erl/MHz/sqkm, providing a capacity increase of approximately 285%.

FIG. 9b shows the increase in network capacity when using two-way C/I monitoring in handover, when the GE window is 20 to 25 dB and C/Imin=14 dB. The GE window in question represents a C/I level used in an ECSD T service, for instance. In an ordinary network without two-way monitoring, the SE value is 4.54 Erl/MHz/sqkm when 0.2% of the C/I samples is below the C/Imin value. Two-way interference monitoring increases the figure that represents network capacity to SE=14 Erl/MHz/sqkm, providing a capacity increase of approximately 180%.

FIG. 9c shows the increase in network capacity when using two-way C/I monitoring in handover, when the GE window is 25 to 30 dB and C/Imin=19 dB. The GE window in question represents a C/I level used in EGPRS, for instance. In an ordinary network without two-way monitoring, the SE value is 4.54 Erl/MHz/sqkm when 0.2% of the C/I samples is below the C/Imin value. Two-way interference monitoring increases the figure that represents network capacity to SE=12 Erl/MHz/sqkm, providing a capacity increase of approximately 130%.

FIG. 10 shows a summary of the results of FIGS. 9a to 9c. As can be seen from the earlier results, the method and system of the invention can in a synchronized network provide a capacity increase of 130 to 285% depending on the C/I area used at each time. The capacity increase provides an opportunity of distributing existing network resources into several sub-areas, i.e. GE windows, meeting different quality requirements. It is then possible to use different data services simultaneously in such a manner that the network capacity remains at an optimal level all the time. When comparing the results of one-way interference monitoring with corresponding two-way results, a significant improvement in the available network capacity can be noted.

The above describes the implementation and embodiments of the invention by means of examples. It is obvious to a person skilled in the art that the invention is not restricted to the details of the embodiments described above and that the invention can be implemented in other ways without departing from the characteristics of the invention. The presented embodiments should be considered illustrative, but not restrictive. The implementation and use of the invention are thus restricted only by the attached claims. Therefore, the different alternative implementations of the invention, including equivalent implementations, defined by the claims come within the scope of the invention.

The invention claimed is:

1. A method, comprising:
   defining a connection quality level value range for information to be communicated in a cell of a communication network, wherein at least one base station defines the cell, mobile stations of the communication network are in an area of the cell, and the mobile stations communicate with the base station on channels
   forming a connection quality parameter value for each of a plurality of channels of the cell; and
   allocating, for said information to be communicated in the cell, a channel of the cell whose connection quality parameter value lies within said connection quality level value range, wherein said allocating said channel comprises changing an existing communication connection from a first channel of the cell to a second channel of the cell and then allocating said first channel for said information to be communicated.

2. The method according to claim 1, further comprising:
forming said connection quality level value range from a first level value and a second level value that are fixed and predefined.

3. The method according to claim 1, further comprising:
forming said connection quality level value range from a first level value and a second level value that are dynamically changeable.

4. The method according to claim 1, further comprising:
defining said connection quality level value range and said connection quality parameter value as a signal-to-interference level range and a signal-to-interference level, respectively.

5. A system, comprising:
a first collection unit configured to collect interference information from channels already in use in a cell of a communications network that includes at least one base station that defines the cell as well as mobile stations in an area of said cell, wherein the mobile stations are configured to communicate with said base station on the channels, and wherein the first collection unit is also configured to collect interference information in at least one neighboring cell;
a second collection unit configured to collect information on traffic load of said cell;
a definition unit configured to define a connection quality level value range for information to be communicated in the cell;
a forming unit configured to form a connection quality parameter value for each of a plurality of channels of the cell based on the collected interference information and traffic load; and
an allocation unit configured to allocate, for said information to be communicated, a channel of the cell whose connection quality parameter value lies within said connection quality level value range,
wherein said allocation unit also comprises a selection unit that is configured to change an existing communication connection from a first channel of the cell to a second channel of the cell and then to allocate said first channel for said information to be communicated.

6. An apparatus, comprising:
a first collection unit configured to collect interference information from channels already in use in the cell of the communications network that includes at least one base station that defines the cell as well as mobile stations in an area of said cell, wherein the mobile stations are configured to communicate with said base station on the channels, and wherein the first collection unit is also configured to collect interference information in at least one neighboring cell;
a second collection unit configured to collect information on a traffic load of said cell;
a definition unit configured to define a connection quality level value range for information to be communicated in the cell;
a forming unit configured to form a connection quality parameter value for each of a plurality of channels of the cell based on the collected interference information and traffic load; and
an allocation unit configured to allocate, for said information to be communicated, a channel of the cell whose connection quality parameter value lies within said connection quality level value range,
wherein said allocation unit also comprises a selection unit that is configured to change an existing communication connection from a first channel of the cell to a second channel of the cell and then to allocate said first channel for said information to be communicated.

7. The apparatus according to claim 6, wherein the apparatus is a base station controller.

8. An apparatus, comprising:
a processor in communication with a memory;
an interference information collector in communication with the processor;
a traffic load information collector in communication with the processor;
a connection quality level value range determination module in communication with the processor;
a connection quality parameter value formation module in communication with the processor; and
a channel allocation module in communication with the processor and configured to allocate a channel in a communications network that includes at least one base station that defines a cell and mobile stations in an area of said cell, the channel of the cell having a connection quality parameter value that lies within a connection quality level value range determined by the connection quality level value range determination module, wherein the mobile stations are configured to communicate with said base station on channels,
wherein said channel allocation module also comprises a selection module that is configured to change an existing communication connection from a first channel of the cell to a second channel of the cell and then to allocate said first channel for said information to be communicated.

9. The apparatus according to claim 8, further comprising:
a base station controller.

10. A system, comprising:
a processor in communication with a memory;
an interference information collector in communication with the processor;
a traffic load information collector in communication with the processor;
a connection quality level value range determination module in communication with the processor;
a connection quality parameter value formation module in communication with the processor; and
a channel allocation module in communication with the processor and configured to allocate a channel in a communications network comprising at least one base station that defines a cell and mobile stations in an area of said cell, the channel of the cell having a connection quality parameter value that lies within a connection quality level value range determined by the connection quality level value range determination module, the mobile stations being configured to communicate with said base station on channels,
wherein said channel allocation module also comprises a selection module that is configured to change an existing communication connection from a first channel of the cell to a second channel of the cell and then to allocate said first channel for said information to be communicated.

11. An apparatus, configured to:
collect interference information from channels already in use in a cell of a communications network comprising at least one base station that defines the cell and mobile stations in an area of said cell, wherein the mobile stations are configured to communicate with said base station on radio channels;

collect interference information in at least one neighboring cell;

collect information on a traffic load of said cell;

define a connection quality level value range for information to be communicated in the cell;

form a connection quality parameter value for each of a plurality of channels of the cell based on the interference information and the information on the traffic load; and allocate, for the information to be communicated, a channel of the cell whose connection quality parameter value lies within said connection quality level value range, wherein said allocating said channel comprises changing an existing communication connection from a first channel of the cell to a second channel of the cell and then allocating said first channel for said information to be communicated.

12. The apparatus according to claim 11, further comprising:
a processor; and
a memory.

13. The apparatus according to claim 11, further comprising:
a base station controller.

14. A system, configured to:
collect interference information from channels already in use in a cell of a communications network comprising at least one base station that defines the cell and mobile stations in an area of said cell, wherein the mobile stations are configured to communicate with said base station on radio channels;

collect interference information in at least one neighboring cell;

collect information on traffic load of said cell;

define a connection quality level value range for information to be communicated in the cell;

form a connection quality parameter value for each of a plurality of channels of the cell based on the interference information and the information on the traffic load; and allocate, for the information to be communicated, a channel of the cell whose connection quality parameter value lies within said connection quality level value range, wherein said allocating said channel comprises changing an existing communication connection from a first channel of the cell to a second channel of the cell and then allocating said first channel for said information to be communicated.

15. A system, comprising:

first collection means for collecting interference information from channels already in use in a cell of a communications network that includes at least one base station that defines the cell as well as mobile stations in an area of said cell, wherein the mobile stations are configured to communicate with said base station on the channels, and wherein the first collection means is also for collecting interference information in at least one neighboring cell;

second collection means for collecting information on a traffic load of said cell;

definition means for defining a connection quality level value range for information to be communicated in the cell;

forming means for forming a connection quality parameter value for each channel of a plurality of channels of the cell based on the collected interference information and traffic load; and allocation means for allocating said information a channel of the cell whose connection quality parameter value lies within said connection quality level value range, wherein said allocation means also comprises selection means for changing an existing communication connection from a first channel of the cell to a second channel of the cell and then allocating said first channel for said information to be communicated.

* * * * *